Figure 1:
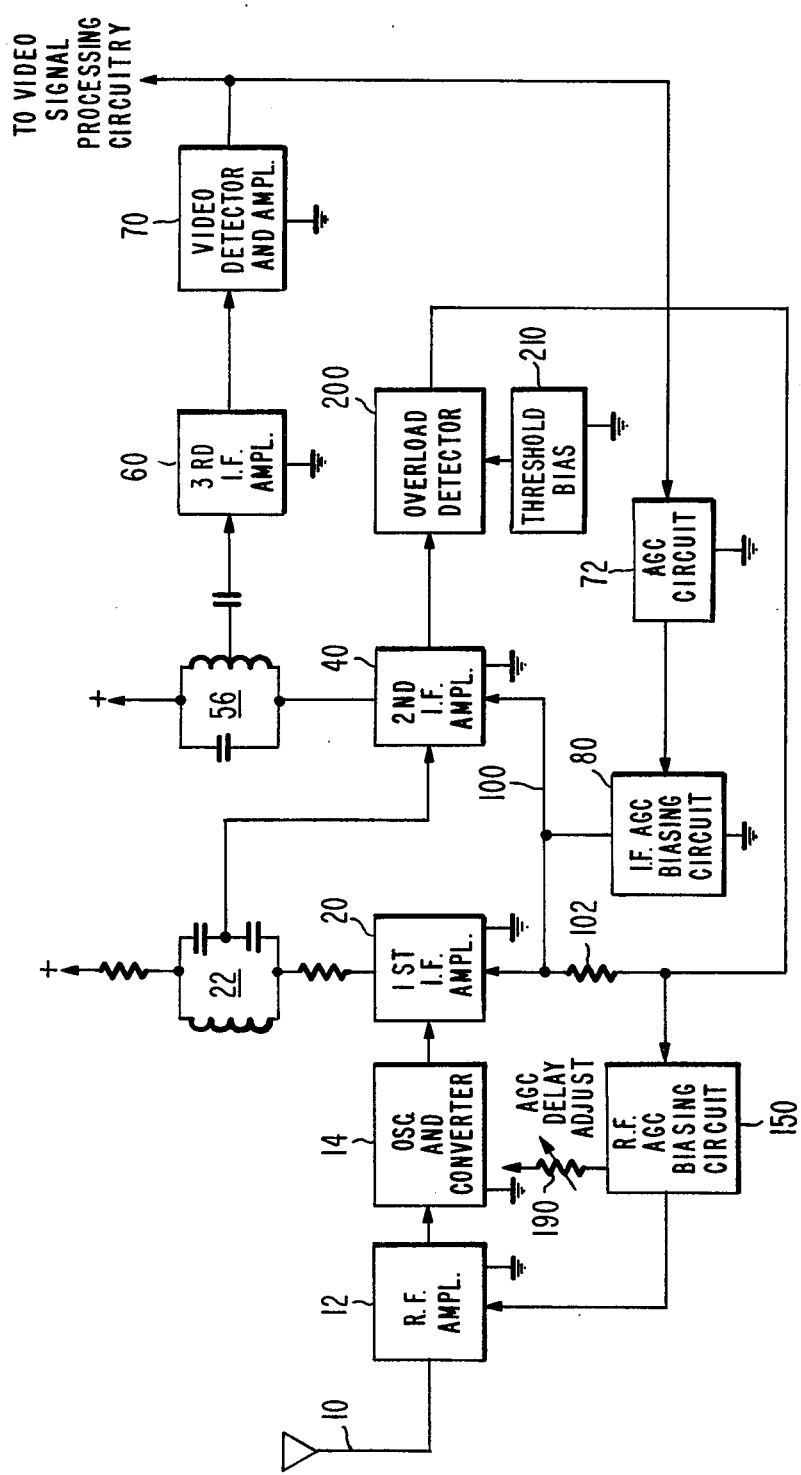

United States Patent [19]

Harford

[11] 4,237,490
[45] Dec. 2, 1980

[54] SIGNAL OVERLOAD PREVENTION CIRCUIT

[75] Inventor: Jack R. Harford, Flemington, N.J.
[73] Assignee: RCA Corporation, New York, N.Y.
[21] Appl. No.: 21,326
[22] Filed: Mar. 16, 1979
[51] Int. Cl.³ .............................................. H04N 5/52
[52] U.S. Cl. .................................................... 358/174
[58] Field of Search ........................................ 358/174

[56] References Cited

U.S. PATENT DOCUMENTS

| 2,885,473 | 5/1959 | Fraft | 358/174 |
|---|---|---|---|
| 3,301,951 | 1/1967 | Humphrey | 358/174 |
| 3,454,721 | 7/1969 | Wolff | 358/174 |
| 3,457,366 | 7/1969 | Kerr et al. | 358/174 |
| 3,585,294 | 6/1971 | Lewis | 358/174 |

Primary Examiner—Richard Murray
Attorney, Agent, or Firm—Eugene M. Whitacre; William H. Meagher; W. Brinton Yorks, Jr.

[57] ABSTRACT

An overload detector is provided for generating an overload signal whenever an I.F. signal exceeds a predetermined level. The overload detector has an input coupled to the emitter circuit of a common emitter transistor of a television I.F. amplifier. When the peaks of the I.F. signal applied to the overload detector exceed the predetermined level, a transistor in the overload detector begins to operate as a class C amplifier, thereby generating a periodic overload signal. The overload signal is applied to the input of the R.F. AGC circuit of the AGC system to reduce the gain of the R.F. amplifier of the television receiver. The gain of the I.F. amplifier is not affected by the overload signal, and thus there is no degradation in the signal-to-noise performance of the I.F. amplifier.

9 Claims, 2 Drawing Figures

SIGNAL OVERLOAD PREVENTION CIRCUIT

This invention relates to television amplifying devices, and more particularly, to a circuit which prevents input signal overloading in a television amplifier.

In order to reproduce a properly synchronized picture image on a television kinescope with correct contrast and color saturation characteristics, it is necessary to maintain constant synchronizing signal levels in the detected video signal. This is accomplished by automatically controlling the gain of radio frequency (R.F.) and intermediate frequency (I.F.) amplifiers in the television receiver in response to the detected levels of the synchronizing signal pulses in the video signal. An automatic gain control (AGC) system senses the level of these synchronizing pulses and controls the gain of the R.F. and I.F. amplifiers so as to maintain the synchronizing signal pulses of the video signal at a constant desired amplitude. When the signal levels of the constant amplitude sync pulses are properly maintained, the level of the picture information portion of the video signal will also be within the proper range of signal levels.

The AGC system will operate as described above for continuous signal variations resulting from such causes as airplanes passing nearby and signal fading. However, correct operation of the AGC system can be defeated by sudden signal discontinuities, which cause a condition known as "lockout". If the television receiver is tuned to a weak signal channel, or is switched through one or more channels which are unused in the local reception area, the AGC system will be operating in a high gain condition. When the receiver is suddenly switched to a strong signal channel, the received R.F. signal can cause the R.F. and I.F. amplifiers to overload. In the overload condition, the I.F. amplifying transistors are driven into a saturation mode by the strong I.F. signal. In the saturation mode the amplifying transistors enter a charge storage condition, wherein the output signal can no longer follow the high frequency transitions of the I.F. input signal. This can result in signal inversion, or a decrease in the detected video signal level with increasing input signal levels. The AGC system will respond to this decreasing signal level by increasing the gain of the I.F. amplifiers which will cause the amplifying transistors to be driven even further into saturation, and the detected video signal level will decline still further. Thus, the AGC system will be "locked out", as it responds to the decreasing signal levels by increasing the gain of the I.F. amplifiers, which sustains the overload condition.

In accordance with the present invention, an overload detector is provided for generating an overload signal whenever an I.F. signal exceeds a predetermined level. The overload detector has an input coupled to the emitter circuit of a common emitter transistor of a television I.F. amplifier. When the peaks of the I.F. signal applied to the overload detector exceed the predetermined level, a transistor in the overload detector begins to operate as a class C amplifier, thereby generating a periodic overload signal. The overload signal is applied to the input of the R.F. AGC circuit of the AGC system to reduce the gain of the R.F. amplifier of the television receiver. The gain of the I.F. amplifier is not affected by the overload signal, and thus there is no degradation in the signal-to-noise performance of the I.F. amplifier.

Figure 2:
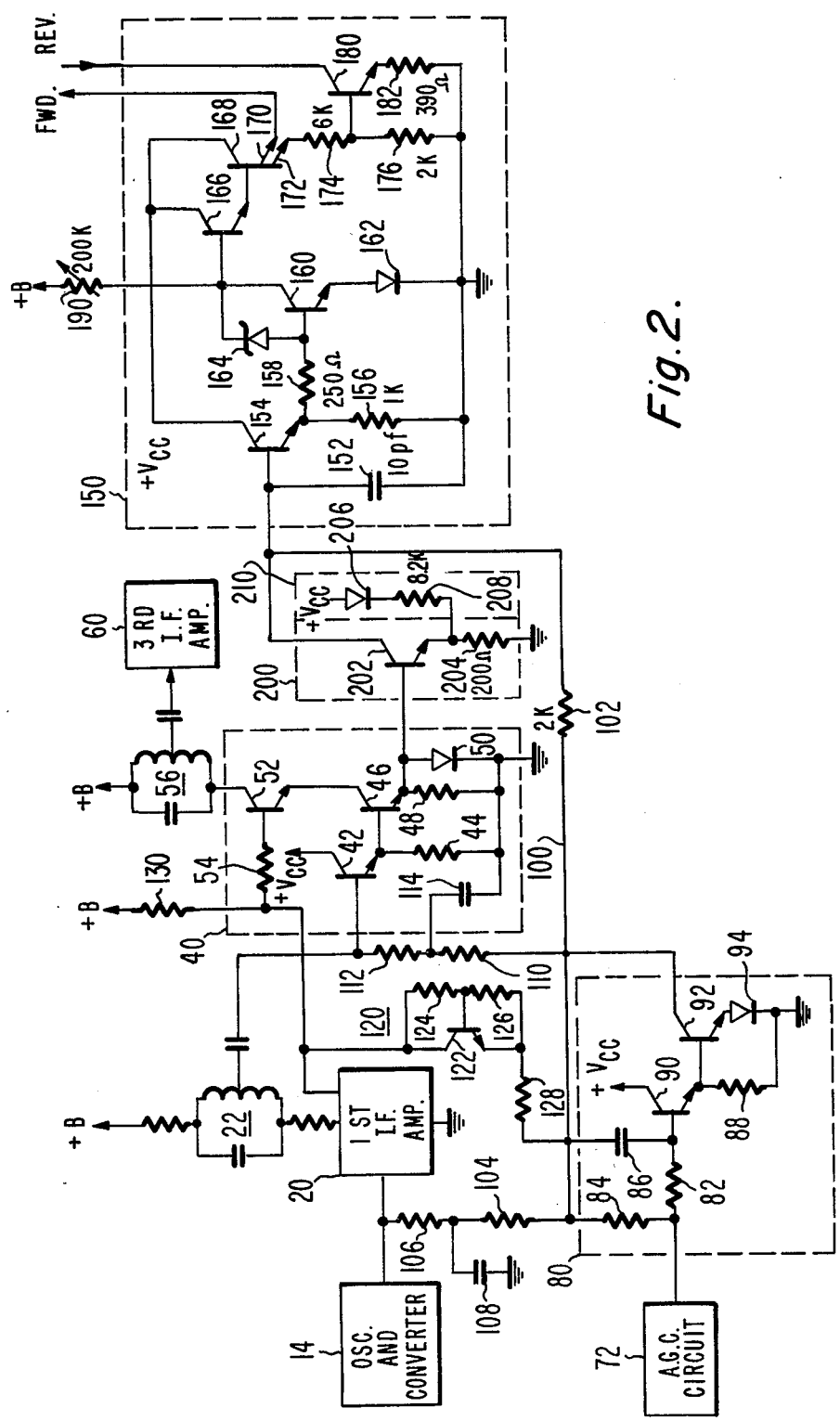

In the accompanying drawing:

FIG. 1 illustrates, partially in block diagram form and partially in schematic diagram form, an automatic gain control system embodying the present invention; and FIG. 2 illustrates, partially in block diagram form and partially in schematic diagram form, a more detailed representation of the automatic gain control system of FIG. 1.

Referring to FIG. 1, the R.F., I.F. and automatic gain control system of a television receiver are illustrated. A broadcast television signal is received by an antenna 10 and is applied to an R.F. amplifier 12, which amplifies the signal in a gain controlled manner. The amplified R.F. signal is coupled to an oscillator and converter 14, where the R.F. signal is mixed in a conventional manner with a signal from a local oscillator to develop an intermediate frequency television signal. The I.F. signal is located in the familiar I.F. passband and is then applied to the first I.F. amplifier 20. The first I.F. amplifier 20 amplifies the I.F. signal in a gain controlled manner. The I.F. signal is then coupled to a second I.F. amplifier 40 by a tuned circuit 22, which provides shaping of the desired I.F. passband. The second I.F. amplifier 40 provides further gain controlled amplification for the I.F. signal, which is then coupled to a third I.F. amplifier 60 by a tuned circuit 56. The third I.F. amplifier operates with a fixed gain and develops the final I.F. signal, although subsequent I.F. amplifying stages may be employed if a higher level I.F. signal is desired.

The final I.F. signal is coupled to a video detector and amplifier 70, which detects the video signal in a conventional manner and provides an amplified video signal at its output. The video signal is then applied to subsequent circuitry for further signal processing and eventual image reproduction on a television kinescope (not shown). The amplified video signal is also applied to an AGC circuit 72 which develops an AGC control signal that varies in signal level as a function of the video signal level. The AGC circuit 72 may be of a type such as that described in U.S. patent application Ser. No. 934,823, filed Aug. 18, 1978 and entitled "KEYED AGC CIRCUIT".

The AGC control signal is coupled to an I.F. AGC biasing circuit 80, which develops an I.F. AGC voltage on an I.F. AGC bus 100. The polarity and range of the I.F. AGC voltage may be chosen to control the gain of the first and second I.F. amplifiers 20 and 40 in either a forward AGC or reverse AGC technique. The forward AGC techniqe reduces the gain of the amplifiers by forward biasing the transistor amplifier, and the reverse AGC technique achieves gain reduction by reducing the forward bias of the amplifier. As is well known, each technique has its own advantages and drawbacks. However, either technique may be used in conjuction with the present invention.

The I.F. AGC voltage on the bus 100 is applied to the first and second I.F. amplifiers 20 and 40, and to the input of an R.F. AGC biasing circuit 150 by way of an isolating resistor 102. The R.F. AGC biasing circuit 150 develops an R.F. AGC voltage which controls the gain of the R.F. amplifier 12. Gain reduction of the R.F. amplifier 12 is generally delayed until after the gain of the I.F. amplifiers has been reduced to substantially minimum levels. At that point, the signal-to-noise ratio in the R.F. amplifier 12 is normally high enough to permit R.F. gain reduction without introducing significant noise problems into the receiver. The point at which R.F. gain reduction is to begin is determined by the setting of a variable resistor 190, which adjusts the level at which the I.F. AGC voltage from bus 100 is sufficient to trigger R.F. gain reduction.

In accordance with the present invention, an overload detector 200 is coupled to receive an I.F. signal from a point intermediate the input and output terminals of the second I.F. amplifier 40. The overload detector also receives a biasing voltage from a threshold bias circuit 210. The overload detector 200 develops an overload signal at its output under signal overload conditions which is coupled to the input of the R.F. AGC biasing circuit 150.

During reception of low and nominal level broadcast signals, the AGC system of FIG. 1 acts to maintain a constant video signal level at the output of the video detector and amplifier 70. The AGC circuit 72 develops an AGC control signal which varies with the level of the synchronizing signal pulses of the detected video signal. During reception of a low level broadcast signal, the I.F. AGC biasing circuit 80 develops an I.F. AGC voltage on the I.F. bus 100 which maintains the first and second I.F. amplifiers 20 and 40 in a high gain condition. As the level of the broadcast signal (and consequently, the video signal level) increases, the AGC circuit 72 causes the I.F. AGC biasing circuit 80 to vary the I.F. AGC voltage in a manner which reduces the gain of the I.F. amplifiers 20 and 40. When the I.F. amplifiers 20 and 40 have substantially traversed, the full range of I.F. gain reduction, the I.F. AGC voltage which is coupled to the R.F. AGC biasing circuit by resistor 102 triggers the commencement of R.F. gain reduction, which is the final stage of automatic gain reduction in the receiver.

When the television receiver is not receiving a broadcast signal, which commonly occurs during channel changes, the AGC system causes the R.F. and I.F. amplifiers 12, 20, and 40 to operate in a high gain condition. When the tuner is finally adjusted to receive a broadcast signal, the sudden reception of a high level signal can overwhelm the receiver, thereby causing the lockout condition described above. During this high signal, high gain condition, the I.F. signal which is coupled to the overload detector 200 by the second I.F. amplifier 40 can have a signal level on the order of 800 to 900 millivolts, as compared to a normal signal level of 100 millivolts or less. The peaks of the 800–900 millivolt signal are in excess of the threshold voltage level which is applied to the overload detector 200 by the threshold bias circuit 210, which causes the overload detector to generate an overload signal whenever the threshold is exceeded. The overload signal is applied to the input of the R.F. AGC biasing circuit 150, and although the overload signal may only appear as momentary pulses, it is sufficient to overcome the R.F. AGC delay and trigger R.F. gain reduction by the biasing circuit 150. Thus, by reducing the gain of the very first amplifying state in the television receiver, signal overloading and AGC lockout in all succeeding amplifying stages is prevented. By applying the overload signal to the R.F. amplifier and not the I.F. amplifiers, the signal-to-noise ratio of the I.F. amplifiers is unimpaired by the overload correction. And since signal-to-noise performance in the R.F. amplifier is critical primarily during weak signal conditions, overall signal-to-noise performance in the television receiver is not degraded by this technique of lockout protection.

Referring to FIG. 2, several of the circuit blocks of FIG. 1 are illustrated in schematic detail and bear the same reference numerals as their equivalents in FIG. 1.

The first I.F. amplifier 20, which receives I.F. signals from the oscillator and converter 14, also is coupled to a source of supply voltage (+B) by a resistor 130. The amplified I.F. signal produced by the first I.F. amplifier 20 is coupled to the base of a transistor 42 in the second I.F. amplifier 40 by the tuned circuit 22. Transistor 42 has a collector coupled to a second source of supply voltage ($+V_{cc}$), which may be derived from the +B supply. The emitter of transistor 42 is coupled to a source of reference potential (ground) by a resistor 44, and to the base of a transistor 46. Transistor 46 has an emitter coupled to ground by the parallel combination of a resistor 48 and a forward biased PIN diode 50, and a collector coupled to the emitter of a transistor 52. The base of transistor 52 is coupled to the +B supply by the serial connection of resistors 54 and 130, and its collector is coupled to the third I.F. amplifier 60 by the tuned circuit 56. Transistors 46 and 52 are arranged in a cascode amplifier configuration, with transistor 46 being biased for gain control by the I.F. AGC voltage on bus 100. The first I.F. amplifier 20 may be constructed in essentially the same manner as the second I.F. amplifier 40. This I.F. amplifier configuration is explained in further detail in copending U.S. Pat. application Ser. No. 21,324, entitled "GAIN CONTROLLED AMPLIFIER AND PIN DIODE FOR USE THEREIN", filed concurrently herewith.

The AGC control voltage at the output of the AGC circuit 72 is applied to the base of a transistor 90 by way of a resistor 82 in the I.F. AGC biasing circuit 80. Transistor 90 has a collector coupled to the $+V_{cc}$ supply, and an emitter coupled to ground by a resistor 88, and to the base of a transistor 92. The emitter of transistor 92 is coupled to ground by a forward biased PIN diode 94, and its collector is coupled to the I.F. AGC bus 100. The base of transistor 90 is coupled to the I.F. AGC bus 100 by a capacitor 86, and the AGC control voltage at the output of the AGC circuit 72 is coupled to the I.F. AGC bus 100 by a resistor 84.

The I.F. AGC voltage on the bus 100 is applied to the inputs of the first and second I.F. amplifiers 20 and 40 by the serial connections of resistors 104 and 106, and 110 and 112, respectively. The I.F. AGC bus 100 is bypassed for nominal I.F. signal levels by the coupling of a capacitor 108 between the junction of resistors 104 and 106 and ground, and a capacitor 114 coupled between the junction of resistors 110 and 112 and ground.

D.C. bias voltage for the I.F. AGC bus 100 is supplied by a multiple $V_{be}$ supply 120. A transistor 122 has its collector coupled to the +B supply by a resistor 130 and its emitter coupled to the I.F. AGC bus 100 by a resistor 128. A resistor 124 is coupled from the collector to the base of transistor 122, and a resistor 126 is coupled from the base to the emitter of transistor 122. In the example shown in FIG. 2, the voltage at the collector of transistor 122 remains at a voltage level which is approximately nine base-to-emitter voltage drops (9 $V_{be}$'s) above ground potential. The multiple $V_{be}$ supply 120 is described in further detail in copending U. S. patent application Ser. No. 21,322, entitled "TEMPERATURE COMPENSATING BIAS CIRCUIT", filed concurrently herewith.

A detailed description of the operation of the I.F. AGC biasing circuit 80 and the I.F. AGC system herein described may be found in the aforementioned copending U.S. patent application Ser. No. 21,324, entitled "GAIN CONTROLLED AMPLIFIER AND PIN DIODE FOR USE THEREIN". For purposes of the present application, it suffices to note that the AGC control voltage developed by the AGC circuit 72 increases with increases in the video signal level; that the I.F. AGC biasing circuit 80 responds to these increases by decreasing the I.F. AGC voltage on the bus 100; and that this decreasing I.F. AGC voltage effects a decrease in the gain of the first and second I.F. amplifiers 20 and 40 through the operation of reverse AGC.

The I.F. AGC bus 100 is coupled to the base of a transistor 154 in the R.F. AGC biasing circuit 150 by the isolation resistor 102. The base of transistor 154 is also coupled to ground by a capacitor 152. The collector of transistor 154 is coupled to the $+V_{cc}$ supply, and its emitter is coupled to ground by a resistor 156, and to the base of a transistor 160 by a resistor 158. The emitter of transistor 160 is coupled to ground by a forward biased PIN diode 162, and its collector is coupled to the base of a transistor 166 and to the variable AGC delay resistor 190. The PIN diode 162 provides the R.F. AGC biasing circuit 150 with semiconductor junction geometry which tracks that of the I.F. AGC biasing circuit 80 which drives it. It may be seen that a 3 $V_{be}$ D.C. bias exists between the base of transistor 154 and the grounded cathode of diode 162, which matches that of the I.F. AGC biasing circuit 80 between the base of transistor 90 and and the grounded cathode of PIN diode 94. A zener diode 164 has its anode coupled to the base of transistor 160 and its cathode coupled to the collector of transistor 160. The zener diode 164 operates as a dynamic range clamp to prevent large increases in the collector voltage of transistor 160, which can occur during channel switching. If the television receiver momentarily receives a very strong broadcast signal during channel switching, the AGC system will react by reducing the gain of the R.F. and I.F. amplifiers. Such gain reduction will cause transistor 160 to become nonconducting, and without the zener diode 164, its collector voltage can rise to the level of the +B supply which is coupled to the variable resistor 190. If the channel selector finally stops at a channel which is receiving a weak broadcast signal, the R.F. amplifier should be operated in a high gain condition, and transistor 160 will have to become conducting to reduce its collector voltage to increase the R.F. gain. However, the AGC system contains many delays which can slow this recovery by the R.F. AGC biasing circuit 150, and may include a capacitor coupled to the collector of transistor 160. The zener diode prevents such slow recovery by the R.F. AGC biasing circuit by clamping the collector voltage of transistor 160 at a maximum level from which the circuit may promptly recover.

Transistor 166 has a collector coupled to the $+V_{cc}$ supply, and an emitter coupled to the base of transistor 168. Transistor 168 has a collector coupled to the $+V_{cc}$ supply and develops a forward AGC voltage for the R.F. amplifier 12 in the television receiver at an emitter electrode 170. Transistor 168 has a second electrode 172 which is coupled to ground by the serial connection of resistors 174 and 176. The junction of resistors 174 and 176 is coupled to the base of a transistor 180, which has an emitter coupled to ground by a resistor 182, and develops a reverse R.F. AGC voltage at its collector electrode. The R.F. AGC biasing circuit 150 thus develops both a forward and a reverse AGC voltage, thereby permitting its use with an R.F. amplifier which requires either gain control technique. It may also be noted that the ranges of the R.F. AGC voltages are not fixed, but are determined by the user through the choice of the load impedance on the R.F. AGC outputs.

The emitter of transistor 46 in the second I.F. amplifier 40 is coupled to the base of a transistor 202 in the overload detector 200. Transistor 202 has an emitter coupled to ground by a resistor 204 and a collector coupled to the input of the R.F. AGC biasing circuit 150 at the base of transistor 154. The threshold bias circuit 210 is comprised of the serial connection of a diode 206 and a resistor 208, with the anode of the diode 206 coupled to the $+V_{cc}$ supply and the resistor 208 coupled to the emitter of transistor 202. In the example shown in FIG. 2, the D.C. bias at the base of the transistor 202 is approximately 1 $V_{be}$ by virtue of PIN diode 50. The D.C. bias at the emitter of transistor 202 is maintained at approximately 280 mv by the threshold bias circuit 210. Thus a 280 mv peak signal level at the base of transistor 202 will cause that transistor to conduct heavily.

The overload detector transistor 202 is responsive to the I.F. signal level at the emitter of transistor 46 for the generation of an overload signal. This particular point in the second I.F. amplifier 40 was chosen as the input signal source for the overload detector 200 for several reasons. First, the emitter of transistor 46 is biased at a relatively low D.C. level, which is approximately 1 $V_{be}$ above ground in this example. This low level provides a substantial range for the I.F. signal at this point before it is clipped at the level of the $+V_{cc}$ supply at the output of the first I.F. amplifier 20, and also permits transistors 202 to be biased near this low level. Second, because the gain of the various amplifying states in the television receiver are cumulative, latter stages may be expected to overload prior to earlier ones under large signal conditions. Specifically, the second I.F. amplifier 40 will generally be overloaded prior to the first I.F. amplifier 20. Under these transitory conditions, transistor 46 will be driven toward saturation by the high level I.F. signal at its base electrode. The I.F. signal at the collector of transistor 46 will stabilize in signal level, and may even decrease in signal level as transistor 46 saturates. Thus, the I.F. signal at the output of the second I.F. amplifier will not provide a true indication of the overload condition, and the decreasing signal level at that point would erroneously indicate that proper AGC control is occurring. However, the signal at the emitter of transistor 46 will be a substantially unamplified replica of the still-acceptable signal at the base of transistor 42 (less the $V_{be}$ drops of transistors 42 and 46) by reason of the emitter follower operation of transistors 42 and 46. Therefore, the I.F. signal at the emitter of transistor 46 will give a true indication of the overload condition at a time when the signal at the output of the second I.F. amplifier is erroneously portraying satisfactory operating conditions.

As previously mentioned, the I.F. AGC voltage on bus 100 decreases as the I.F. signal level increases. The decreasing I.F. AGC voltage reverse AGC's the first and second I.F. amplifiers 20 and 40, resulting in over 40 decibels of gain reduction in these amplifiers. As the I.F. amplifiers approach the limit of I.F. gain reduction, the low I.F. AGC voltage which is applied to the base of transistor 154 by way of the isolation resistor 102 causes that transistor to reduce its conduction. The voltage at the emitter of transistor 154 will decrease as the transistor is turned off, which causes transistor 160 to reduce its conduction. The voltage at the collector of transistor 160 will increase at a rate determined by the setting of the variable R.F. AGC delay resistor 190 as transistor 160 is turned off. Eventually, a voltage level will be reached at the base of transistor 166 which is sufficient to turn that transistor on, which in turn will cause transistor 168 to begin conduction. Current will then flow through the first emitter 170 of transistor 168, which may be used to develop an increasing forward AGC voltage for the R.F. amplifier. Simultaneously, current will flow through the second emitter 172 of transistor 168, which will cause transistor 180 to begin conduction. Current will then flow through the collector of transistor 180, in an opposite polarity to the current flow in the first emitter 170 of transistor 168. The collector current of transistor 180 may be used to develop a decreasing reverse AGC voltage for the R.F. amplifier.

The nominal range of I.F. signals at the input to the first I.F. amplifier 20 is 100 microvolts to 100 millivolts. Within this range of input signal levels, the AGC system is capable of maintaining the desired level of the detected video signal. However, the oscillator and converter 14 is capable of providing input signals having levels up to approximately 1 volt when the R.F. amplifier 12 receives a strong R.F. signal under high gain conditions. It has been found that AGC lockout can occur in the system shown in FIG. 2 at I.F. signal levels above 800 millivolts, when such input signals are applied to the system when it is operating in a high gain condition. But at these high signal levels, the peaks of the I.F. signal at the emitter of transistor 46 will be in excess of the threshold level necessary to turn on transistor 202. Transistor 202 will therefore conduct during these signal peaks in what is commonly known as class C operation. This periodic conduction by transistor 202 will decrease the voltage level at the base of transistor 154, causing that transistor to reduce its conduction and thereby commence R.F. gain reduction by the R.F. AGC biasing circuit 150. With the gain of the R.F. amplifier thereby reduced, the I.F. signal level at the input to the oscillator and converter 14 and the input to the first and second I.F. amplifiers 20 and 40 will decrease, thus preventing AGC lockout. The gain of the television system is then adjusted by the AGC system to accommodate the strong R.F. signal received by the television receiver.

The class C operation of the overload detector transistor 202 will cause the input signal at the base of transistor 154 to have an A.C. signal component. However, this A.C. component is substantially attenuated by capacitor 152, which is in shunt with the input to the R.F. AGC biasing circuit 150.

It has been found that very strong I.F. signals at the input to the first I.F. amplifier 20 will appear in attenuated form on the I.F. AGC bus 100. These input signals are coupled to the I.F. AGC bus 100 by resistors 106 and 104, but are attenuated by approximately 10 decibels by low-pass filters comprised of resistor 106 and capacitor 108, and resistor 104 and capacitor 86. Likewise, I.F. signals will be coupled to the I.F. AGC bus 100 in an attenuated form from the input to the second I.F. amplifier 40 by resistors 112 and 110. If the I.F. signals thus supplied from the input to the second I.F. amplifier 40 have been delayed by the first I.F. amplifier 20 and the tuned circuit 22 such that they are in phase opposition to the I.F. signals coupled from the input to the first I.F. amplifier 20, they will tend to cancel each other and have a negligible effect on the AGC system. However, if these signals are coupled to the I.F. AGC bus in a like phase relationship, they will additively combine, and will be coupled to the input of the R.F. AGC biasing circuit 150 by the isolation resistor 102. Although the input to the R.F. AGC biasing circuit 150 is shunted by the capacitor 152, the peaks of these I.F. signals can be of a phase and polarity such that they will act to maintain transistor 154 in a conducting state, thereby opposing the operation of the overload detector transistor 202. However, in the example illustrated in FIG. 2, it may be seen that current supplied by transistor 202 is supplied from an impedance defined primarily by the 200 ohm emitter resistance of transistor 202, whereas the I.F. signal components on the I.F. AGC bus 100 are supplied by an impedance defined primarily by the 2000 ohm resistance of the isolation resistor 102. Thus, the current drawn by transistor 202 will dominate the current supplied by the isolation resistor 102, and the R.F. AGC biasing circuit will be triggered into operation to prevent lockout of the AGC system.

What is claimed is:

1. In a television receiver including a radio frequency amplifying stage; means coupled to said radio frequency amplifying stage for converting a radio frequency signal to an intermediate frequency signal; an intermediate frequency amplifying stage coupled to said converting means, to which an intermediate frequency signal of amplitude sufficient to overload said stage may be applied; and an automatic gain control system including means responsive to the level of a detected video signal for developing an AGC control signal, means responsive to said AGC control signal for controlling the gain of said intermediate frequency amplifying stage, and means responsive to said AGC control signal for controlling the gain of said radio frequency amplifying stage; apparatus comprising:

an overload detector, coupled to said intermediate frequency amplifying stage and independent of said AGC control signal developing means, for generating an overload signal whenever said intermediate frequency signal exceeds a threshold level;

and means for utilizing said overload signal to reduce the gain of said radio frequency amplifying stage without affecting the gain of said gain controlled intermediate frequency amplifying stage, said overload signal utilizing means comprising means for rendering said radio frequency amplifying stage gain controlling means additionally responsive to said overload signal when generated.

2. The television receiver of claim 1, wherein said overload signal utilizing means exhibits an output impedance of a first impedance value when said overload detector is not generating an overload signal and of a second impedance value which is less than said first impedance value when said overload detector is generating an overload signal.

3. The television receiver of claim 2 further comprising means responsive to said AGC control signal for developing an I.F. gain control voltage; means for utilizing said I.F. gain control voltage to control the gain of said intermediate frequency amplifying stage; and means, having a given impedance of a value intermediate said first and second impedance values, for coupling said I.F. gain control voltage developing means to said means for controlling the gain of said radio frequency amplifying stage.

4. The television receiver of claim 1, wherein said intermediate frequency amplifying stage includes an input for receiving an intermediate frequency signal, an output at which an amplified intermediate frequency signal is normally produced, and a terminal at which a substantially unamplified intermediate frequency signal is normally produced, said terminal being coupled to the input of said overload detector.

5. The television receiver of claim 4, wherein said intermediate frequency amplifying stage comprises a transistor coupled in a common emitter configuration and having a base electrode coupled to said converting means, a collector electrode for developing an amplified intermediate frequency signal, and an emitter electrode coupled to said overload detector.

6. The television receiver of claim 1, wherein said overload detector comprises a transistor having a base electrode coupled to said intermediate frequency amplifying stage, a collector electrode coupled to said overload signal utilizing means and an emitter electrode, and further comprising means coupled to said emitter electrode for developing a predetermined voltage level at said emitter electrode.

7. The television receiver of claim 6, wherein said threshold level is substantially equal to said predetermined voltage level plus the base-to-emitter voltage of said transistor.

8. In a television receiver including a radio frequency amplifying stage; means coupled to said radio frequency amplifying stage for converting a radio frequency signal to an intermediate frequency signal; an intermediate frequency amplifying stage coupled to said converting means to which an intermediate frequency signal of amplitude sufficient to overload said stage may be applied; an automatic gain control system for developing an AGC control voltage which varies over first and second ranges of voltages; means for applying said AGC control voltage to said intermediate frequency amplifying stage for varying the gain of said stage as said AGC control voltage traverses said first range; and means responsive to said AGC control voltage for varying the gain of said radio frequency amplifying stage as said AGC control voltage traverses said second range, said radio frequency amplifying stage gain varying means including means for preventing any variation in the gain of said radio frequency amplifying stage when said AGC control voltage is varied over said first range of voltages; apparatus comprising;

an overload detector, coupled to said intermediate frequency amplifying stage and independent of said automatic gain control system, for generating an overload signal only when said intermediate frequency signal exceeds a threshold level, said overload signal having a voltage level which is exclusively within said second range of voltages; and means for utilizing said overload signal to reduce the gain of said radio frequency amplifying state regardless of the level of said AGC control voltage, said overload signal utilizing means comprising means for rendering said radio frequency amplifying stage gain varying means additionally responsive to said overload signal when generated.

9. The television receiver of claim 8, wherein said radio frequency amplifying stage gain variation preventing means comprises:

a transistor having an input electrode responsive to said AGC control voltage and said overload signal and an output electrode;

a voltage source coupled to said output electrode for biasing said transistor to respond to said second voltage range; and means coupled to the output electrode of said transistor for preventing voltage excursions at said output electrode beyond a desired maximum level.

* * * * *